US008014587B2

(12) United States Patent
Watanabe

(10) Patent No.: US 8,014,587 B2
(45) Date of Patent: Sep. 6, 2011

(54) PATTERN TEST METHOD OF TESTING, IN ONLY SPECIFIC REGION, DEFECT OF PATTERN ON SAMPLE FORMED BY CHARGED BEAM LITHOGRAPHY APPARATUS

(75) Inventor: Yumi Watanabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1044 days.

(21) Appl. No.: 11/892,680

(22) Filed: Aug. 27, 2007

(65) Prior Publication Data

US 2008/0056571 A1 Mar. 6, 2008

(30) Foreign Application Priority Data

Aug. 29, 2006 (JP) ................................ 2006-232455

(51) Int. Cl.
*G06K 9/00* (2006.01)

(52) U.S. Cl. ........ 382/149; 382/141; 382/145; 382/146; 382/147; 382/148; 382/150; 382/151; 348/125; 348/126; 348/129; 348/130

(58) Field of Classification Search .................. 382/141, 382/145–151; 348/125–134
See application file for complete search history.

(56) References Cited

U.S. PATENT DOCUMENTS 6,415,432 B1 * 7/2002 Saito et al. ...................... 716/55
6,539,106 B1 * 3/2003 Gallarda et al. .............. 382/149
6,723,973 B2 4/2004 Saito
6,904,164 B2 6/2005 Norioka et al.
2002/0033449 A1 * 3/2002 Nakasuji et al. .............. 250/306

FOREIGN PATENT DOCUMENTS

JP 2003-324061 11/2003
JP 2005-250106 9/2005

OTHER PUBLICATIONS

Notification of Reasons for Rejection, mailed by Japanese Patent Office Action on Dec. 9, 2008, in Japanese Application No. 2006-232455.

* cited by examiner

*Primary Examiner* — Vikkram Bali
*Assistant Examiner* — Daniel Zeilberger
(74) *Attorney, Agent, or Firm* — Finnegan, Henderson, Farabow, Garrett & Dunner, L.L.P.

(57) ABSTRACT

Disclosed is a pattern test method in which a drawing region is divided into a plurality of deflection regions determined by the deflection width of a deflector of a charged beam lithography apparatus, the charged beam lithography apparatus draws a pattern in each divided deflection region on the basis of pattern design data to obtain a sample, and a defect of the pattern on the sample is tested. The method determines the coordinates of a connecting portion of the deflection regions, divides the pattern design data into boundary region pattern data as the connecting portion of the deflection regions and pattern data except for the boundary region pattern data, and obtains image data of the pattern formed on the sample. The method then compares the boundary region pattern data with the image data.

9 Claims, 5 Drawing Sheets

Pattern data A
Divide into minimum drawing units S11
Electron beam lithography data B
Test region width
Determine test range S12
Extract boundary region pattern data S13
Test data C1
Electron beam lithography S14
Sense image of pattern S15
Image data B'
Compare S16

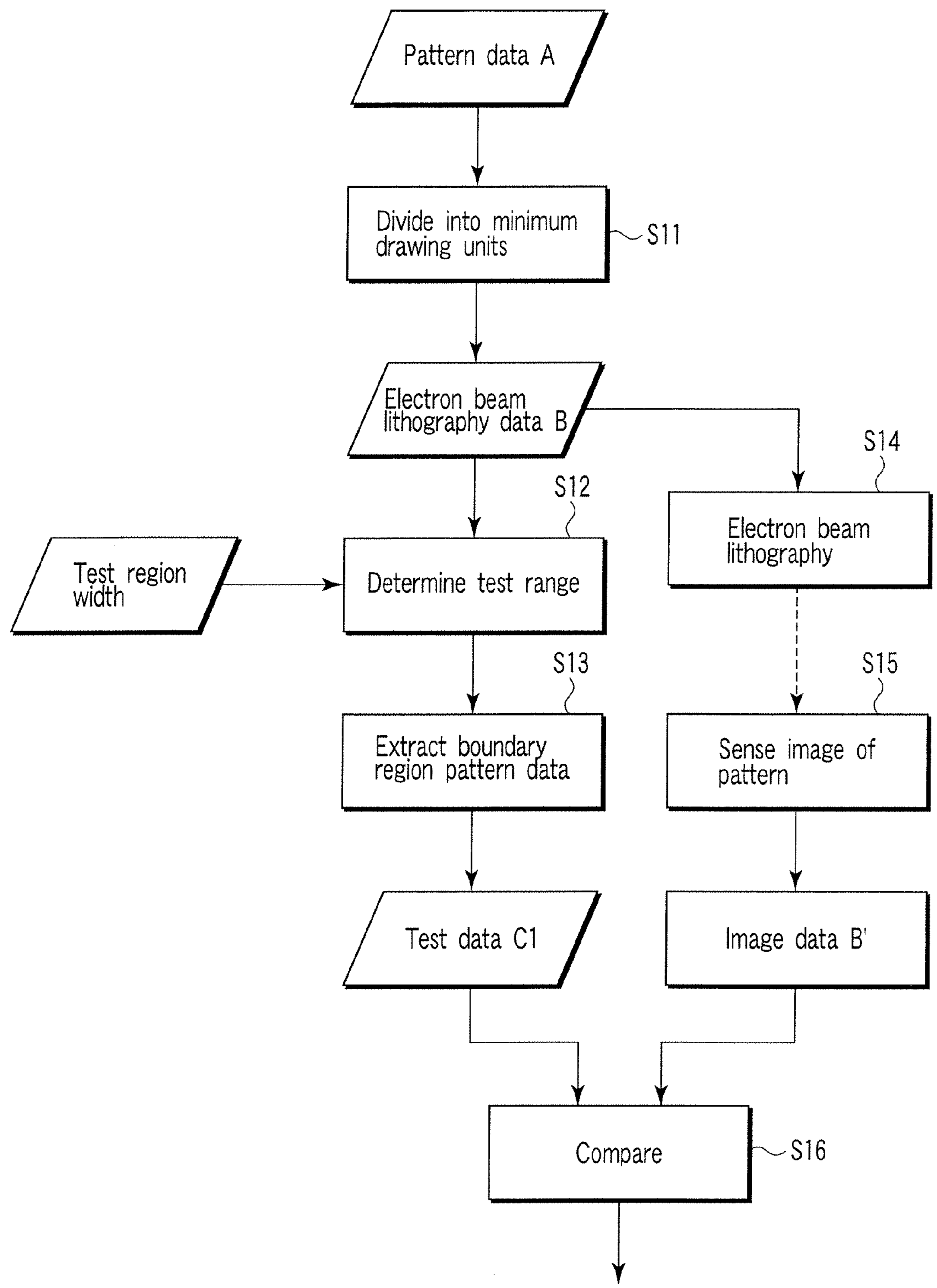
F I G. 1

PATTERN TEST METHOD OF TESTING, IN ONLY SPECIFIC REGION, DEFECT OF PATTERN ON SAMPLE FORMED BY CHARGED BEAM LITHOGRAPHY APPARATUS

CROSS-REFERENCE TO RELATED APPLICATIONS

This application is based upon and claims the benefit of priority from prior Japanese Patent Application No. 2006-232455, filed Aug. 29, 2006, the entire contents of which are incorporated herein by reference.

BACKGROUND OF THE INVENTION

1. Field of the Invention

The present invention relates to a pattern test method of testing a defect of a pattern on a sample formed by a charged beam lithography apparatus and, more particularly, to a pattern test method of testing not a whole test region but a specific test region.

2. Description of the Related Art

The electron beam lithography technique is attracting attention as next-generation lithography because this technique has a high pattern resolution and is a reticle-less process.

When drawing a pattern on a substrate coated with a photosensitive material, the limit of a region in which the pattern can be drawn with a stage on which the substrate is placed being stopped is the range within which a deflector can electrically deflect an electron beam. When actually forming a device pattern, after the pattern is drawn in this range, the stage is moved, and the pattern is drawn in an adjacent region. The whole device pattern is formed by repeating this operation, and connecting the individual deflection regions.

In this pattern drawing, a connection error sometimes occurs in the boundary portion between the deflection regions. As a pattern defect element in electron beam lithography, the problem of this connection error is very serious and generally caused by a lithography apparatus. Also, the fabrication process causes defects in addition to this defect caused by a lithography apparatus.

As a method of detecting a defect of electron beam lithography as a reticle-less process, a test (database test) by comparison of a real pattern formed on a substrate with drawing pattern data is effective (e.g., Jpn. Pat. Appln. KOKAI Publication No. 2005-250106). However, database test of an entire substrate takes a very long time.

As described above, both an electron beam lithography apparatus and the fabrication process cause defects of a pattern formed on a sample by the lithography apparatus. Any conventional test method does not distinguish between these defects. For example, any conventional test method tests defects caused by both a lithography apparatus and the fabrication process even when it is necessary to test only defects caused by the lithography apparatus. This decreases the test throughput.

BRIEF SUMMARY OF THE INVENTION

An aspect of the present invention, there is provided a pattern test method in which a drawing region is divided into a plurality of deflection regions determined by a deflection width of a deflector of a charged beam lithography apparatus, the charged beam lithography apparatus draws a pattern in each divided deflection region on the basis of pattern design data to obtain a sample, and a defect of the pattern on the sample is tested, the pattern test method comprising determining coordinates of a connecting portion of the deflection regions, dividing the pattern design data into boundary region pattern data as the connecting portion of the deflection regions, and pattern data except for the boundary region pattern data, obtaining image data of the pattern formed on the sample, and comparing the boundary region pattern data with the image data.

Another aspect of the present invention, there is provided a pattern test method in which a drawing region is divided into a plurality of deflection regions determined by a deflection width of a deflector of a charged beam lithography apparatus, the charged beam lithography apparatus draws a pattern in each divided deflection region on the basis of pattern design data to obtain a sample, and a defect of the pattern on the sample is tested, the pattern test method comprising determining coordinates of a connecting portion of the deflection regions, dividing the pattern design data into boundary region pattern data as the connecting portion of the deflection regions, and pattern data except for the boundary region pattern data, obtaining image data of the pattern formed on the sample, and comparing the pattern data except for the boundary region pattern data with the image data.

Still another aspect of the present invention, there is provided a pattern test method in which a drawing region is divided into a plurality of deflection regions determined by a deflection width of a deflector of a charged beam lithography apparatus, the charged beam lithography apparatus draws a pattern in each divided deflection region on the basis of pattern design data to obtain a sample, and a defect of the pattern on the sample is tested, the pattern test method comprising determining coordinates of a connecting portion of the deflection regions, dividing the pattern design data into boundary region pattern data as the connecting portion of the deflection regions, and pattern data except for the boundary region pattern data, obtaining image data of the pattern formed on the sample, selecting one of the boundary region pattern data and the pattern data except for the boundary region pattern data as a region to be tested, and comparing the pattern data in the selected region with the image data.

BRIEF DESCRIPTION OF THE SEVERAL VIEWS OF THE DRAWING

FIG. 1 is a flowchart schematically showing the operation of a pattern test method according to the first embodiment of the present invention;

DETAILED DESCRIPTION OF THE INVENTION

First Embodiment

FIG. 1 is a flowchart schematically showing the operation of a pattern test method according to the first embodiment of the present invention.

Figure 2A:
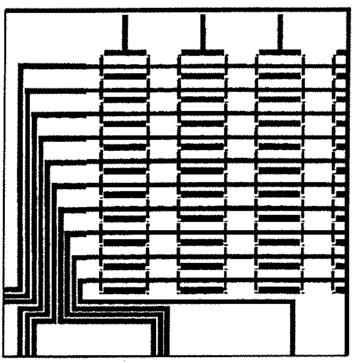
FIGS. 2A to 2E are plan views for explaining the first embodiment of the present invention, each of which shows pattern data obtained in a corresponding step.
Figure 2B:
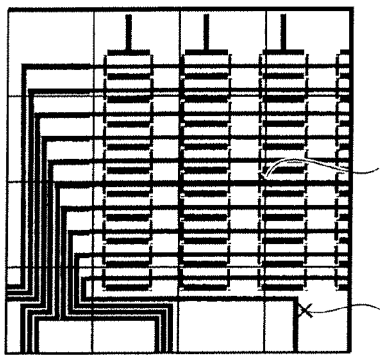

In the first step (step S11), device design data (pattern data) A of, e.g., (the GDSII format), as shown in FIG. 2A, which is the original of a pattern to be formed on a wafer (sample), is input, and the whole device chip region is divided into minimum drawing units (deflection regions) determined by the deflection width of a deflector of an electron beam lithography apparatus. In this manner, a plurality of electron beam lithography data B as shown in FIG. 2B are obtained. Simultaneously, central coordinate information α of each deflection region is obtained. The electron beam lithography data B is used when drawing an actual pattern on the wafer by the electron beam lithography apparatus (step S14).

Figure 2C:
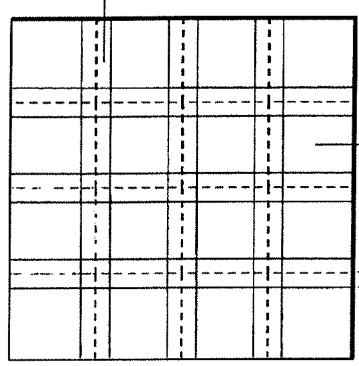

In the second step (step S12), vertex coordinates β of each deflection region are calculated from the deflection region width and central coordinate information α. In addition, as shown in FIG. 2C, a test range γ in each region is input to determine a test region C of the whole device chip. In this step, each test region as a unit is assigned an index number.

Figure 2D:
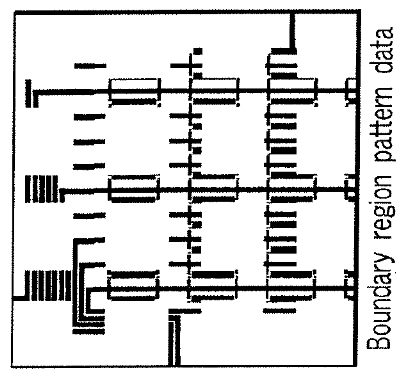

In the third step (step S13), an arithmetic operation is performed using the device design data and test region C, the device design data is divided into boundary region pattern data C1 and pattern data C2 except for the boundary region, and each pattern data is converted into a defect test data format (e.g., the GDSII format). Then, the boundary region pattern data C1 as a test region is output. FIG. 2D shows the boundary region pattern data C1.

On the other hand, an image sensing device such as a scanning electron microscope (SEM) is used to sense an image of the pattern formed on the wafer by using the electron beam lithography data B (step S15), thereby obtaining image data B'. The image data B' need not be the whole pattern on the wafer, and need only be a region corresponding to the boundary portion between the deflection regions. Subsequently, a defect test in the connecting portion of the deflection regions is performed by comparing the boundary region pattern data C1 with the image data B' (step S16).

Figure 3:
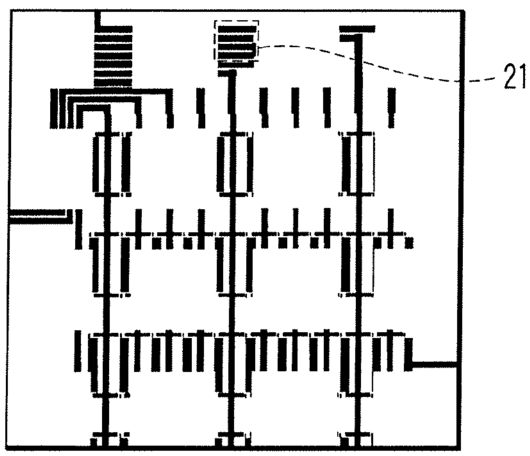
FIG. 3 is a plan view showing boundary region pattern data.
Figure 4:
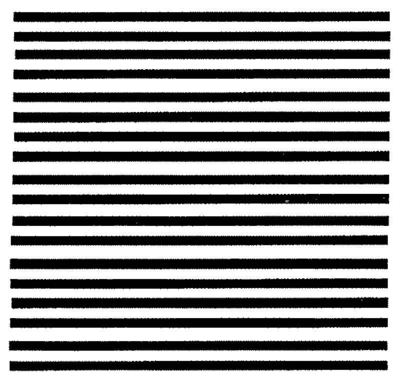
FIG. 4 is a plan view showing, in an enlarged scale, a portion of the boundary region pattern data shown in FIG. 3.
Figure 5:
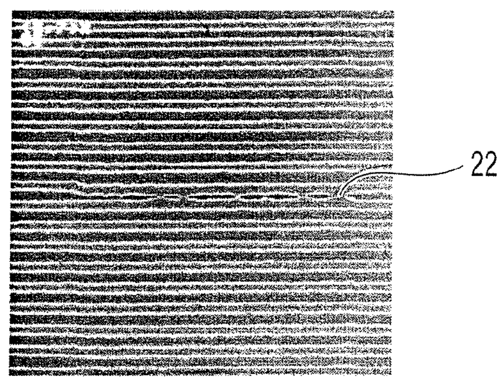
FIG. 5 is a microphotograph showing image data obtained by sensing an image of a pattern on a wafer with an SEM.

FIGS. 3 to 5 illustrate patterns in this comparative test. FIG. 3 shows the boundary region pattern data C1. FIG. 4 shows, in an enlarged scale, a portion (enclosed with dotted lines 21) of the boundary region pattern data C1 shown in FIG. 3. FIG. 5 shows the image data (SEM image) B' obtained by sensing an image of the pattern on the wafer. In this comparative determination in step S16, the test data shown in FIG. 4 is compared with the image data shown in FIG. 5, and it is determined that, e.g., a portion that does not match the test pattern is a defect. Reference number 22 in FIG. 5 denotes a detected defect indicating that adjacent lines have shortcircuited.

In the first embodiment as described above, only the boundary portion between the deflection regions is a test region. Therefore, a test can be performed within a period shorter than that for a test of the entire wafer. Note that although the method tests only defects caused by a lithography apparatus in this case, the method is effective in quickly testing a pattern like this.

Both a lithography apparatus and the fabrication process cause defects. Defects caused by a lithography apparatus are regular and readily occur in the boundary between the deflection regions. Defects caused by the process are random and readily occur in a region except for the boundary between the deflection regions. If the fabrication process is well completed and causes no defect, therefore, a defect test of this embodiment can test defects caused by an apparatus within a short period with high throughput.

Also, each test region as a unit is assigned an index number. This makes it possible to rapidly extract test units of the boundary region pattern data C1 corresponding to a region to be tested of the image data B', thereby increasing the test efficiency.

Second Embodiment

Figure 6:
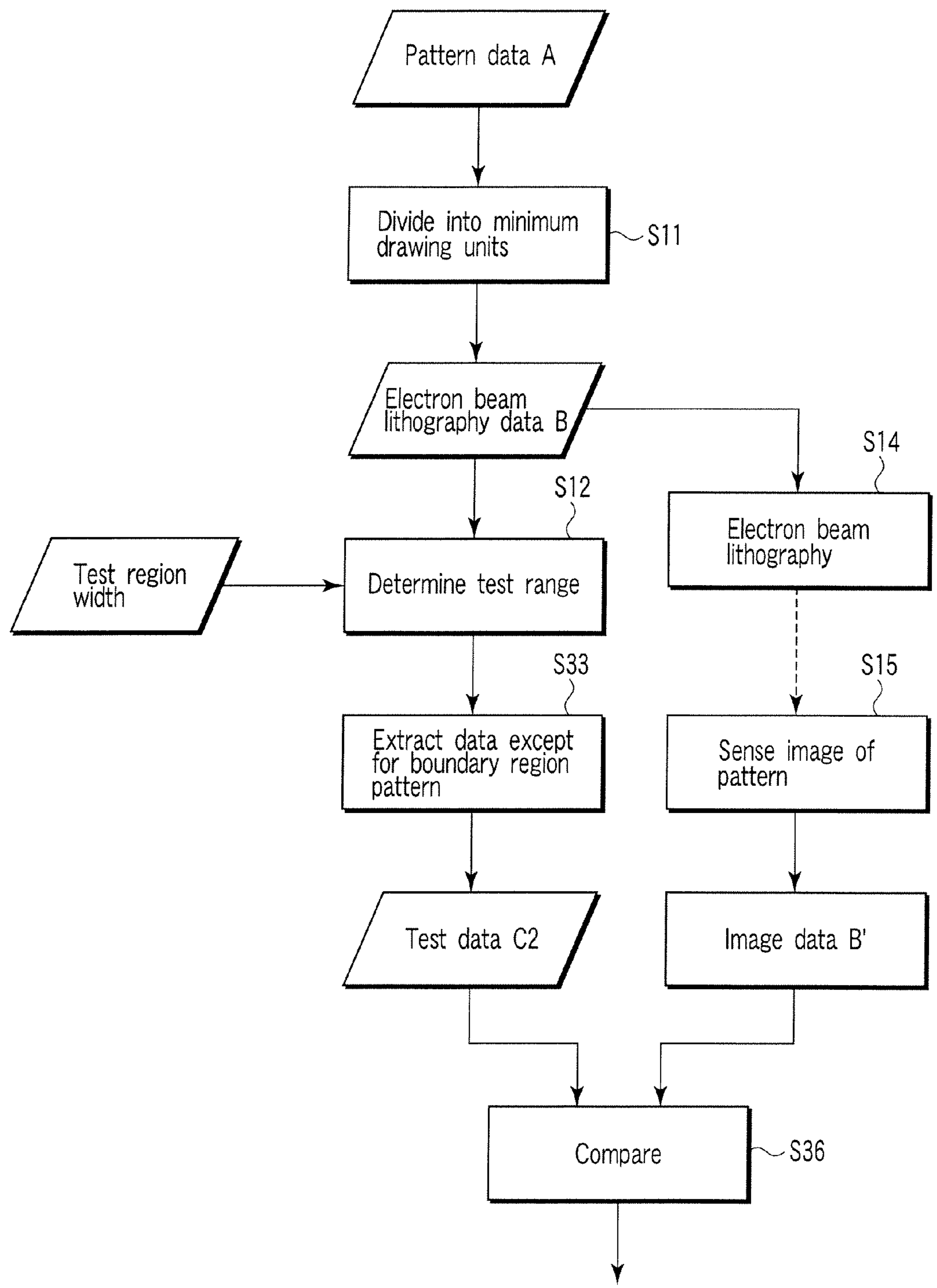
FIG. 6 is a flowchart schematically showing the operation of a pattern test method according to the second embodiment of the present invention.

FIG. 6 is a flowchart schematically showing the operation of a pattern test method according to the second embodiment of the present invention.

Although the basic operation is the same as the first embodiment, this embodiment compares pattern data except for a boundary region with image data, instead of comparing boundary region pattern data with the image data.

Steps S11 and S12 are the same as the first embodiment; as shown in FIGS. 2A to 2C, device design data (pattern data) A is input, electron beam lithography data B is obtained by dividing the whole device chip region into minimum drawing units (deflection regions), and a test region C of the whole device chip is determined.

Figure 2E:
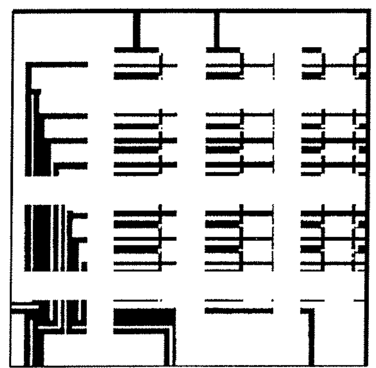

Then, in the third step (step S33), an arithmetic operation is performed using the device design data and test region C, the device design data is divided into boundary region pattern data C1 and pattern data C2 except for the boundary region, and the pattern data C2 except for the boundary region as a test region is output. FIG. 2E shows the pattern data C2 except for the boundary region.

Subsequently, a defect test in a portion except for the connecting portion of the deflection regions is performed by comparing the pattern data C2 except for the boundary region with the image data B' (step S36).

Figure 7:
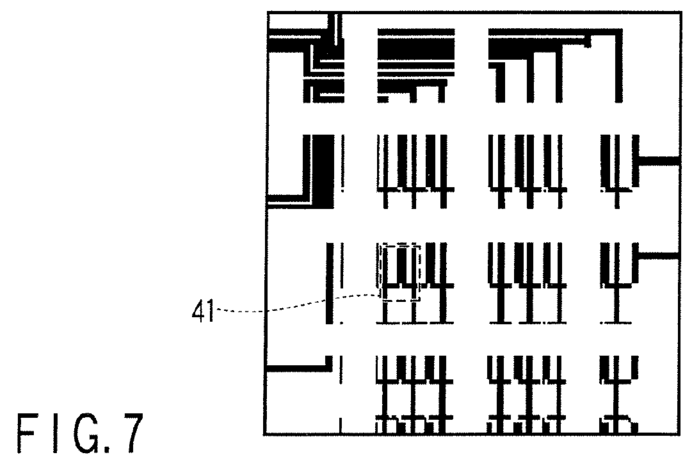
FIG. 7 is a plan view showing pattern data except for a boundary region.
Figure 8:
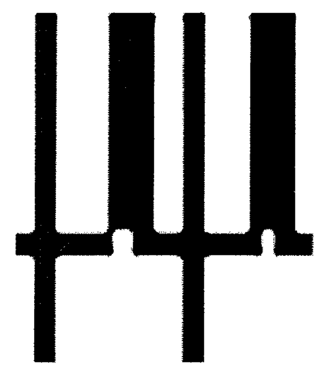
FIG. 8 is a plan view showing, in an enlarged scale, a portion of the pattern data except for the boundary region shown in FIG. 7.
Figure 9:
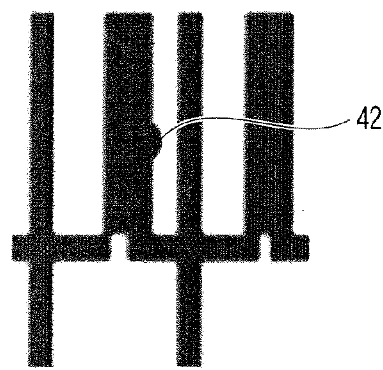
FIG. 9 is a microphotograph showing image data obtained by sensing an image of a pattern on a wafer with an SEM.

FIGS. 7 to 9 illustrate patterns in this comparative test. FIG. 7 shows the pattern data C2 except for the boundary region. FIG. 8 shows, in an enlarged scale, a portion (enclosed with dotted lines 41) of the pattern data C2 except for the boundary region shown in FIG. 7. FIG. 9 shows the image data (SEM image) B' obtained by sensing an image of the pattern on the wafer. In this comparative determination in step S36, the test pattern shown in FIG. 8 is compared with the image data shown in FIG. 9, and it is determined that, e.g., a portion that does not match the test pattern is a defect. Reference number 42 in FIG. 9 denotes a detected defect.

In the second embodiment as described above, only a portion except for the boundary portion between the deflection regions is a test region. Therefore, a test can be performed within a period shorter than that for a test of the entire wafer. Note that although the method tests only defects caused by the fabrication process in this case, the method is effective in quickly testing a pattern like this. That is, if an electron beam lithography apparatus is well completed and causes no defect, a defect test of this embodiment can test random defects caused by the process within a short period with high throughput.

(Modifications)

Note that the present invention is not limited to the above embodiments. The first embodiment compares the boundary region pattern data with the image data, and the second embodiment compares the pattern data except for the boundary region with the image data. However, the first and second embodiments may also be combined. That is, it is also possible, in accordance with the type of defect to be tested, to select one of the boundary region pattern data and the pattern data except for the boundary region as a test pattern, and compare the selected test pattern with the image data.

Additionally, a lithography apparatus is not limited to an electron beam lithography apparatus. The present invention is also applicable to an ion beam lithography apparatus, provided that the apparatus uses a method of drawing a pattern by dividing a drawing region into a plurality of deflection regions. Furthermore, a sample to be subjected to pattern drawing is not limited to a substrate such as a semiconductor wafer. It is also possible to use a mask substrate for reticle formation.

As described above, according to one aspect of this invention, when performing a test by comparing a drawing pattern actually formed on a sample by a charged beam lithography apparatus with drawing data, the test throughput can be increased by dividing design data into boundary region pattern data as the connecting portion of deflection regions and pattern data except for the boundary region, and comparing one of these pattern data with image data (data obtained by sensing an image of the drawing pattern).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-implemented pattern test method in which a drawing region is divided into a plurality of deflection regions determined by a deflection width of a deflector of a charged beam lithography apparatus, the charged beam lithography apparatus draws a pattern in each divided deflection region on the basis of pattern design data to obtain a sample, and a defect of the pattern on the sample is tested, the pattern test method comprising:

determining, by a computer, coordinates of a connecting portion of the deflection regions;

dividing, by a computer, the pattern design data into boundary region pattern data as the connecting portion of the deflection regions, and pattern data except for the boundary region pattern data;

obtaining, by a computer, image data of the pattern formed on the sample; and comparing, by a computer, the boundary region pattern data with the image data to detect defect on the sample, wherein determining coordinates of a connecting portion of the deflection regions includes calculating vertex coordinates of each deflection region from a width of the deflection region and central coordinate information, and determining a test region of the deflection region on the basis of the vertex coordinates.

2. A method according to claim 1, wherein determining a test region of each deflection region on the basis of the vertex coordinates includes inputting a test range in each deflection region, and determining a test region of a whole device chip.

3. A method according to claim 2, further comprising assigning an index number to each test region as a unit, after determining the test region.

4. A computer-implemented pattern test method in which a drawing region is divided into a plurality of deflection regions determined by a deflection width of a deflector of a charged beam lithography apparatus, the charged beam lithography apparatus draws a pattern in each divided deflection region on the basis of pattern design data to obtain a sample, and a defect of the pattern on the sample is tested, the pattern test method comprising:

determining, by a computer, coordinates of a connecting portion of the deflection regions;

dividing, by a computer, the pattern design data into boundary region pattern data as the connecting portion of the deflection regions, and pattern data except for the boundary region pattern data;

obtaining, by a computer, image data of the pattern formed on the sample; and comparing, by a computer, the pattern data except for the boundary region pattern data with the image data to detect defect on the sample, wherein determining coordinates of a connecting portion of the deflection regions includes calculating vertex coordinates of each deflection region from a width of the deflection region and central coordinate information, and determining a test region of the deflection region on the basis of the vertex coordinates.

5. A method according to claim 4, wherein determining a test region of each deflection region on the basis of the vertex coordinates includes inputting a test range in each deflection region, and determining a test region of a whole device chip.

6. A method according to claim 5, further comprising assigning an index number to each test region as a unit, after determining the test region.

7. A computer-implemented pattern test method in which a drawing region is divided into a plurality of deflection regions determined by a deflection width of a deflector of a charged beam lithography apparatus, the charged beam lithography apparatus draws a pattern in each divided deflection region on the basis of pattern design data to obtain a sample, and a defect of the pattern on the sample is tested, the pattern test method comprising:

determining, by a computer, coordinates of a connecting portion of the deflection regions;

dividing, by a commuter, the pattern design data into boundary region pattern data as the connecting portion of the deflection regions, and pattern data except for the boundary region pattern data;

obtaining, by a computer, image data of the pattern formed on the sample;

selecting, by a computer, one of the boundary region pattern data and the pattern data except for the boundary region pattern data as a region to be tested; and comparing, by a computer, the pattern data in the selected region with the image data to detect defect on the sample, wherein determining coordinates of a connecting portion of the deflection regions includes calculating vertex coordinates of each deflection region from a width of the deflection region and central coordinate information, and determining a test region of the deflection region on the basis of the vertex coordinates.

8. A method according to claim 7, wherein determining a test region of each deflection region on the basis of the vertex coordinates includes inputting a test range in each deflection region, and determining a test region of a whole device chip.

9. A method according to claim 8, further comprising assigning an index number to each test region as a unit, after determining the test region.

* * * * *

UNITED STATES PATENT AND TRADEMARK OFFICE

CERTIFICATE OF CORRECTION

PATENT NO. : 8,014,587 B2
APPLICATION NO. : 11/892680
DATED : September 6, 2011
INVENTOR(S) : Watanabe It is certified that error appears in the above-identified patent and that said Letters Patent is hereby corrected as shown below:

Claim 7, column 6, line 40, change “by a commuter” to --by a computer--.

Signed and Sealed this
Third Day of January, 2012

David J. Kappos
*Director of the United States Patent and Trademark Office*